June 16, 1931.  R. W. HYDE  1,810,313
PROCESS OF AND APPARATUS FOR HEAT TREATING ALKALINE
EARTH CARBONATE AND OTHER MATERIALS
Filed April 16, 1926   4 Sheets-Sheet 3

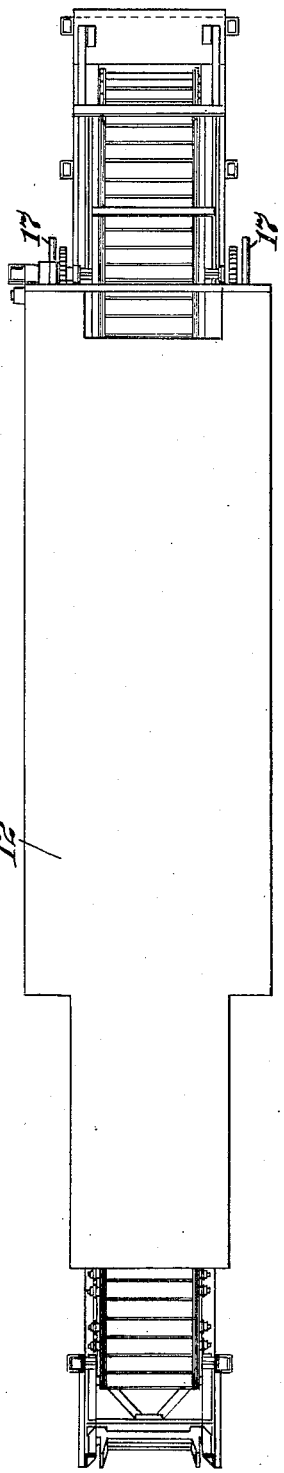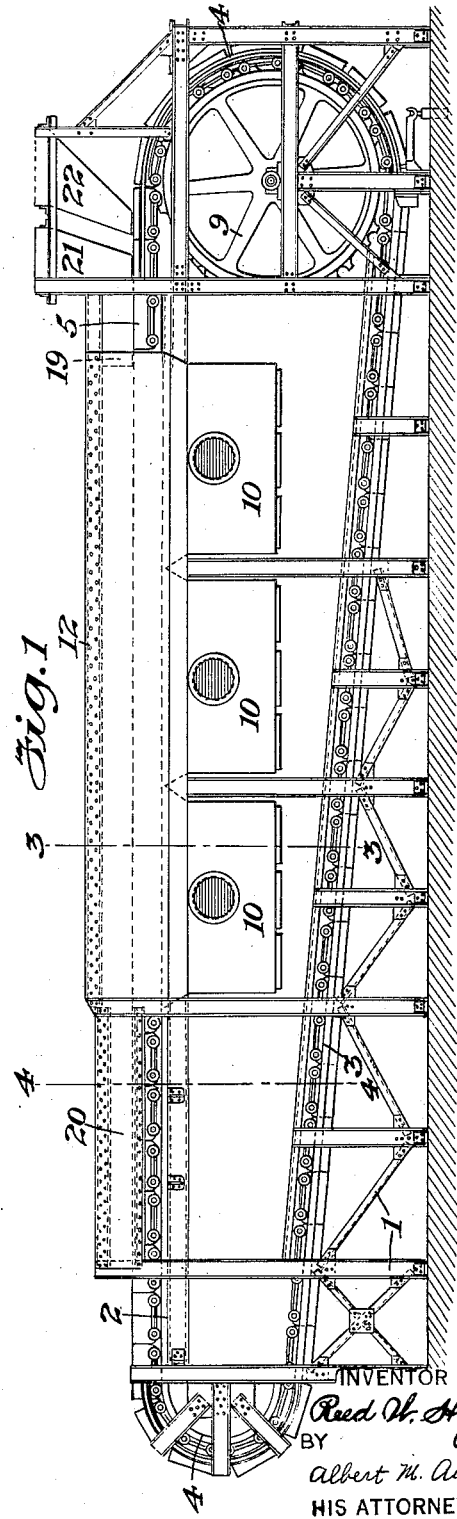

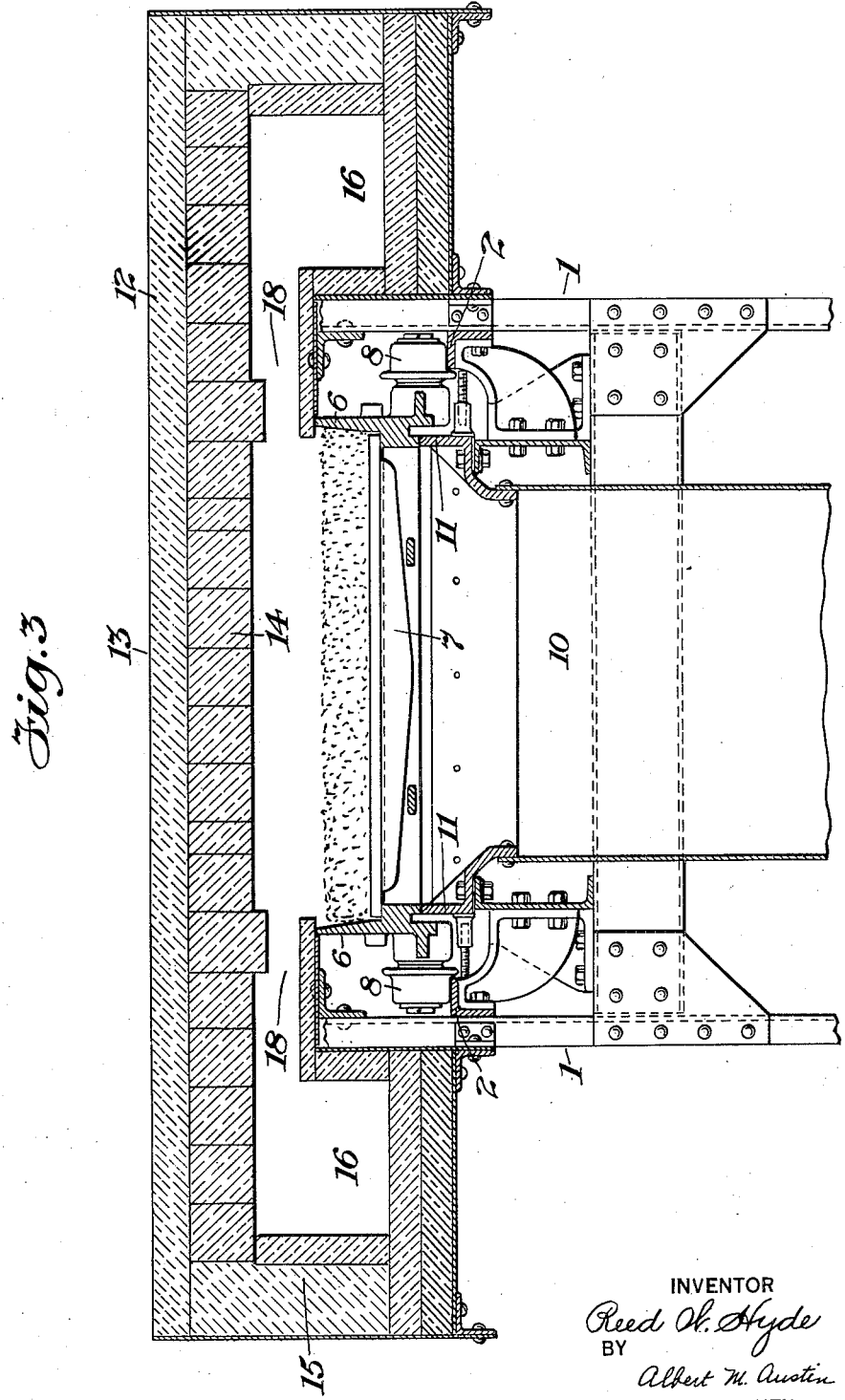

INVENTOR
Reed W. Hyde
BY
Albert M. Austin
HIS ATTORNEY

June 16, 1931. R. W. HYDE 1,810,313
PROCESS OF AND APPARATUS FOR HEAT TREATING ALKALINE
EARTH CARBONATE AND OTHER MATERIALS
Filed April 16, 1926 4 Sheets-Sheet 4
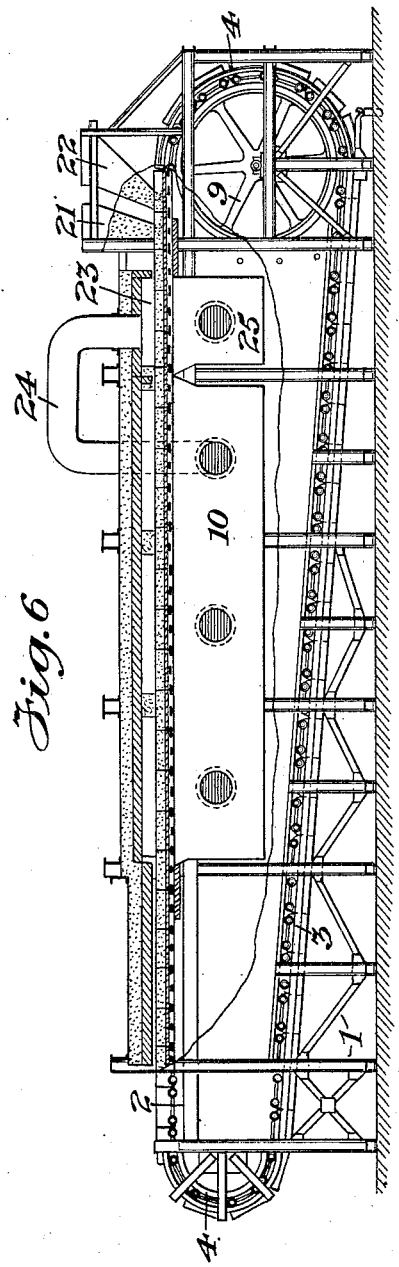
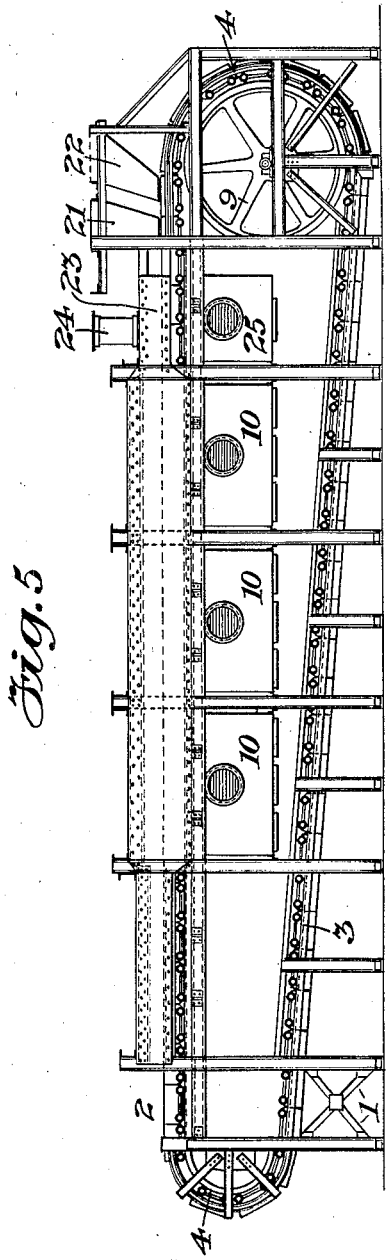
INVENTOR
Reed W. Hyde
BY
Albert W. Austin
HIS ATTORNEY Patented June 16, 1931

1,810,313

UNITED STATES PATENT OFFICE

REED W. HYDE, OF SUMMIT, NEW JERSEY, ASSIGNOR TO DWIGHT AND LLOYD METAL-LURGICAL COMPANY, OF NEW YORK, N. Y., A CORPORATION OF NEW JERSEY

PROCESS OF AND APPARATUS FOR HEAT TREATING ALKALINE EARTH CARBONATE AND OTHER MATERIALS

Application filed April 16, 1926. Serial No. 102,593.

This invention relates to apparatus for and process of subjecting materials to relatively high temperatures, and relates especially to apparatus for treating and calcining limestone or other alkaline earth carbonate.

The apparatus consists broadly in a series of containers or receptacles which travel at a regulated speed through a heating zone where gases at a predetermined high temperature are passed through the material in the containers, whereby the material under treatment is subjected to a desired temperature for a period sufficient to produce necessary or desired chemical and physical changes. These containers may be of any approved form which will expose a relatively large surface area of the material contained to contact with the heated gases, and in which the material under treatment may be spread in layers of desired thinness on a pervious support which will permit the heated gases to be passed through the layer at a uniform rate and evenly throughout the area of the material. These containers may be disconnected elements, each pushed along a track by the one behind, or may be connected to form an endless chain or belt. The movement of the cointainers is regulated by controlling the speed of progress through the heating zone, thereby determining the period of time that the material in each particular container is subjected to treatment.

The apparatus further consists in improved means for producing and enclosing a heating zone of relatively high temperature which will permit passage of the material under treatment therethrough and which will be effective and economical in operation. Preferably the heating zone comprises a chamber with low walls and a roof of refractory material, the bottom being formed by the series of receptacles containing the material. Adjacent to this chamber and communicating with the interior thereof by suitable openings are one or more combustion chambers wherein fuel such as oil, gas, or powdered coal may be commingled with the requisite percentage of air and be burned, the hot products of combustion passing into the heating zone or calcining chamber and through the layer of material undergoing treatment. Preferably connected with the heating zone, or calcining chamber is what may be termed a soaking zone chamber wherein loss of heat from the material as by radiation may be reduced to a minimum and the temperature of the material being treated may be maintained at a relatively high degree for a desired length of time without additional heat being supplied from an outside source and wherein the rate of cooling of the material may also be regulated and controlled. A period of time is required for the desired change to occur completely throughout the interior of a given piece of material or particle after the piece has been supplied with the necessary heat in the heating zone. By delaying dissipation of this heat for the necessary length of time the desired change is permitted to proceed to completion without leaving a kernel of untreated material in the interior of the particle. In the above described chamber or zone this is accomplished, since the rapid dissipation of the heat which would otherwise occur is prevented and the material retains its heat or "soaks" for the necessary length of time. For this reason this chamber is called the "soaking" chamber. It serves to conserve heat to a marked degree, and effects great economies in the amount of fuel required for the treatment as well as promoting uniformity of the finished product.

The apparatus further consists in a new and novel arrangement for pre-heating the material to be treated prior to its entry into the heating zone chamber. In this pre-heating zone the still relatively hot gases from the heating zone raise the temperature of the material to be treated, thereby utilizing heat which would otherwise be lost.

The invention also consists in a process in which the material to be treated may first be heated to a desired high temperature by means of heated gases which may be passed through the mass of material thereby insuring direct contact between the gases and the individual particles comprising the mass, and may then be held at a high temperature, without the application of additional heat, for a further period of time to permit the desired changes to proceed substantially to completion. If desired the material may first be pre-heated by causing the still hot waste gases from the direct heating of the material to be passed through the mass before the mass enters the zone where the highly heated gases are passed through it.

Various other objects and advantages of the invention will be obvious from the following particular description of forms of mechanism embodying the invention or from an inspection of the accompanying drawings; and the invention also consists in certain new and novel features of construction and combinations of parts hereinafter set forth and claimed.

In the drawings:

Fig. 1 is a side elevation of one embodiment of my invention;

Fig. 2 is a plan view of the same;

Fig. 3 is a sectional view on the line 3—3 of Fig. 1;

Fig. 5 is a modified form of my invention; and

Fig. 6 is a section down the active length of the machine.

Figure 4:
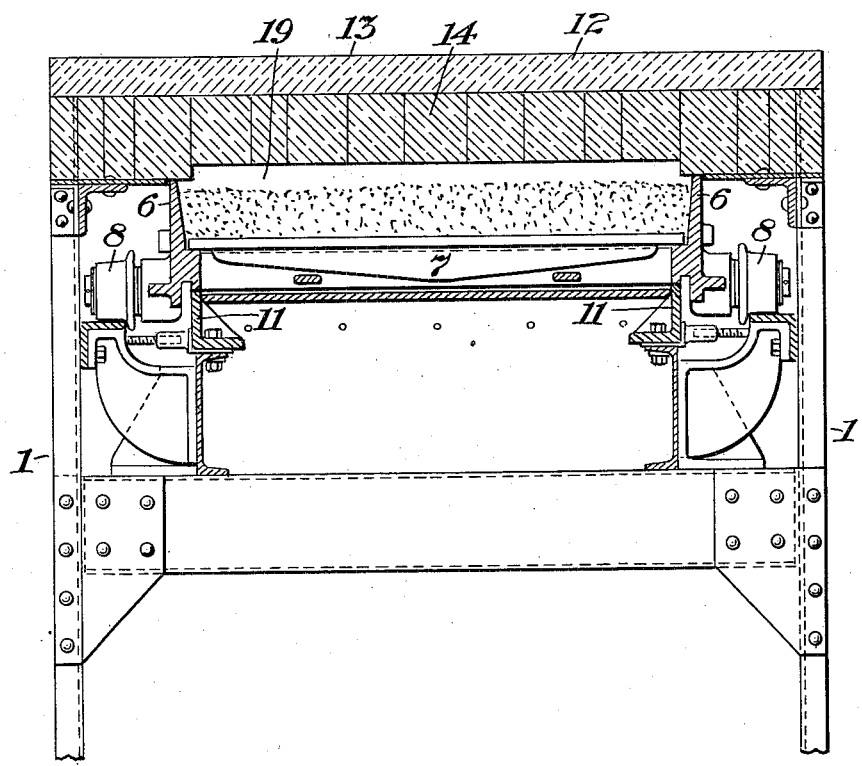
Fig. 4 is a sectional view on the line 4—4 of Fig. 1.

Referring to the embodiment of the invention shown in Figs. 1 to 4 inclusive my machine may be supported in any convenient manner by any suitable structure such as a framework 1. A straight level upper track 2 and a straight inclined lower track 3 and vertical curved end tracks 4 uniting the upper and lower tracks may be rigidly supported in position either by being directly secured to the framework or in any other suitable manner.

The tracks constitute fixed supports for movable containers or pallets 5, and form a continuous path therefor. The pallets are preferably alike in construction and each may have a box-like form with side walls 6 and a pervious support 7 for material, with wheels 8 to support the same on the tracks. The pervious support may be preferably formed of removable grate bars. The pallets may be independent or connected together if desired, and may be placed end to end with sufficient pallets to fill the tracks, thus making a continuous train.

It is obvious that expansion of the tracks will result from the heating of the apparatus. This expansion may be taken care of either by making the track slightly longer than the length of the train of pallets when these are cold, or by providing an expansion joint at some point in the track system.

For imparting motion to the apparatus there may be provided a pair of sprocket wheels 9. These sprocket wheels may be mounted at the rear end of the machine and may be driven by any suitable mechanism. The teeth of these sprockets are so constructed as to engage the pallets as they arrive at the portion of the lower track 3 adjacent to the sprockets. Then as the sprockets slowly revolve the pallets are forced upwardly around the rear vertical track curve and onto the upward horizontal track 2. Each pallet as it reaches the upper track pushes against the pallet ahead so that the entire train is moved forward slowly along the upper track, down the forward curved portion 4 and back to the starting place, completing the circuit. The rate of travel is adjustable by means of suitable speed control devices connected with the driving mechanism and may be either continuous or intermittent as desired.

An open top suction box 10 may be positioned below the pallets for the major portion of the length of the upper horizontal track 2. The suction box may be supported by the framework 1 or in any other suitable manner, and may be connected by suitable piping to an exhaust fan or other suction device, not shown. The upper edges of the box may be provided with strips 11 positioned to fit closely the bottom of the pallets to prevent leakage as the pallets slide over the strips. The front and rear top edges of the suction box may be provided with smooth plates or other means over which the pallets slide with an air tight joint as they pass to and leave a position over the suction box, thereby preventing leakage of air during the time that a pallet is partly over the suction box.

Over the suction box and the track traversed by the pallets there is positioned a low roof or arch 12 which may comprise a layer of heat insulating material 13 above a layer of refractory material 14 to reduce heat losses. The roof may be of any conventional type and may be carried on low walls which may be supported directly by the framework of the machine or in any other suitable manner. This roof with its supporting walls comprises what I call the heating zone or calcining chamber.

Along either side of the heating zone chamber are long, narrow combustion chambers 16 into which suitable fuel burners 17 or other sources of heat project heated gases. Openings 18 may be provided to permit these heated gases to be distributed into the space below the roof from which they can be drawn through the bed of material undergoing treatment, into the suction box 10 and out to the stack by the action of the exhauster. It is obvious that the combustion chambers need not be located alongside the heating zone but they may be at the end or above the pallets, distributing the heated gases down the length of the roofed space.

The combustion chambers may be made large enough to provide space in which combustion of the fuel may be substantially completed, so that when the gases are brought in contact with the material in the heating chamber they will have been heated to a substantially uniform temperature, and the surface of the material therefore need not be subjected to the exceedingly intense heat developed at the instant of combustion when such fuels as, for example, oil, are used.

To seal the pallets against leakage as well as to protect the metal thereof from excessive heat, the upper outside edges may pass closely under the refractory bottom, and the distributing openings (Figs. 3 and 4). At the front end of the roof a wall 19 comes down close to the top surface of the bed of material to reduce leakage at this point.

The portion of my machine comprising the suction box, the heating zone or calcining chamber and the combustion chambers I call a "treatment or heating zone". Beyond this may be the "soaking zone" 20 which may be covered by a continuation of the refractory roof which may be built to fit closely to the upper surface of the bed of materials on the pallets and may be substantially sealed to the pallets to prevent leakage, but as shown in Fig. 4 is not provided with combustion chambers.

This soaking zone materially reduces the loss of heat from the material undergoing treatment, as by radiation and convection currents, and decreases the rate of cooling of the material. This permits the desired reactions, such as calcination, to continue in the material for a further period or until the material has cooled to a temperature below the reacting temperature, thereby conserving heat and decreasing the amount of fuel required. For some purposes, as for drying materials, this soaking zone may be omitted.

For filling the pallets after having been elevated to the upper horizontal track there may be provided a hopper or hoppers of any desired number, two being shown by way of example. These hoppers 21 and 22 are positioned above the pallets at a point just in front of the heating zone and are provided with devices for regulating the amount of material fed from each hopper and for leveling the surface of the layer. One of these hoppers may hold and feed the material as limestone or other alkaline earth carbonate, or preferably a mixture of the carbonate and coal or other fuel. The other hopper may be provided to hold and feed grate dressing material such as burnt lime for covering the grates of the pallets prior to their receiving the charge, but it may be omitted if desired.

In operation as each carrier or pallet is pushed forward along the upper track by the action of the sprocket wheels it passes first under the hopper 21 where it receives a thin layer of grate dressing material spread on the grates and against the pallet sides. This material is previously treated material brought back to the hopper by any suitable means or may be inert material which afterward may be separated from the treated material if desired. Its function is to protect the metal parts from excessive heat. For some purposes it may be omitted. The slowly advancing pallet then receives a uniform charge of material from the raw material hopper which may be divided into several parts to feed thin layers of different materials onto the pallets. Next it passes under the end wall into the heating zone under the roof and over the wind box. Here the hot gases generated in the combustion chamber by combustion of the fuel at the burners, or gases heated by any other suitable means desired, are distributed in the space under the roof through the distributing openings and are drawn through the bed of material into the wind box and out through the same by the action of the exhauster. In passing through the bed of material the gases give up their heat to the material undergoing treatment. The volume and temperature of the gases supplied are co-ordinated with the speed of travel of the pallets through the heating zone so that the amount and intensity of heat required for the desired treatment is supplied to the material on the pallets. Thus each pallet remains in the heating zone until the treatment of the material it carries has been completed, as for example, in the case of calcining limestone until the stone will have been practically all calcined.

The pallet then passes into and through the soaking zone where the material can cool only very slowly, thereby assuring completion of the desired treatment without additional heating. For example, in calcining limestone, the larger pieces of stone which require more time for calcination than do the smaller, may not have been completely calcined in passing through the heating zone, but in the soaking zone the required temperature is maintained in a sufficient length of time to complete the calcination. Obviously this construction permits a saving in fuel, for otherwise the limestone would have to remain in the heating zone for a longer period. Also in such operations as the burning of clay products it is necessary to cool the product very slowly to avoid cracking, and this is accomplished by the soaking zone.

Finally, as the pallet moves forward from the soaking zone it reaches and passes round the curved section of track discharging its load into a hopper or other receptacle and returns by way of the lower track to the sprocket wheels which elevate it and push it forward to repeat the cycle.

For some uses of the apparatus, especially where the desired treatment requires a high temperature, it may be economical to pre-heat the material before it reaches the heating zone and for this purpose the gases drawn from the heating zone through the suction box may be utilized. In Figs. 5 and 6 I have shown a modified form of the apparatus for doing this. Between the hopper and the end wall of the heating zone is a "pre-heating" zone 23 in which the pallets pass through a short space covered by the refractory roof. The gases from the suction box are passed by suitable fan shown diagrammatically at 26 and piping 24 through the roof and into the space 23 constituting the pre-heating zone, through the material on the pallets and out through a supplementary suction box 25. Thus the still relatively hot gases from the heating zone pass through and give up their heat to the material in the pre-heating zone, thereby raising the temperature of this material nearly to the required working temperature and utilizing heat which would otherwise be wasted. In this construction the suction box and the connecting piping should be insulated against loss of heat.

For treating some materials it may be desirable to rabble or stir the material, and this may be done by building supports into the roof from which the rabbles may be suspended so as to project into the bed of material and stir it as the pallet carries it along.

By my invention the treatment of materials may be effected in an economical manner with the movement of the material under accurate regulation and control. By my construction gases may be efficiently heated to a predetermined high temperature and conducted to the material under treatment with a minimum loss of heat. By the use of my soaking zone chamber completion of the desired reactions may be brought about with a conservation in heat and decrease in the amount of fuel otherwise required. By the use of the pre-heating zone the still relatively hot gases from the heating zone are utilized to conserve heat and decrease the amount of fuel otherwise required.

It is obvious that the invention may be used for such purposes as burning clay products or cement clinker, roasting ores, and for other purposes in which it may be necessary to heat materials uniformly throughout by the application of heat from an external source.

While I have shown and described and have pointed out in the annexed claims certain novel features of the invention, it will be understood that various omissions, substitutions and changes in the forms and details of the device illustrated and in its operation may be made by those skilled in the art without departing from the spirit of the invention.

Having described my invention, I claim:

1. In an apparatus for heating material, the combination with a chamber providing a pre-heating zone for the material of a chamber providing a heating zone for the material and a chamber providing a soaking zone for the material, a series of receptacles having perforate bottoms for supporting the material in a pervious layer movable successively through said chambers, means for advancing said receptacles through said chambers, a combustion chamber adjacent to and connected with said heating chamber substantially throughout its length whereby hot combustion gases are delivered to the material while it is being advanced through the heating chamber only, and means for drawing the gases through the material and for delivering them to the material being advanced through the pre-heating chamber.

2. In an apparatus for calcining limestone, the combination with a chamber providing a pre-heating zone for the limestone, of a chamber providing a calcining zone for the limestone and a chamber providing a soaking zone for the limestone, suction boxes beneath said pre-heating chamber and said calcining chamber, a series of receptacles having perforate bottoms for the limestone movable successively through said chambers and over said suction boxes, means for advancing said receptacles through said chambers, a combustion chamber for delivering hot gaseous fluid to said calcining chamber but not to said soaking chamber, and means for delivering still hot gaseous fluid from the suction box beneath said calcining chamber to the limestone while being advanced through the pre-heating chamber.

3. In an apparatus for heat treating material, a heating chamber in which material is heated, a suction box beneath said heating chamber, a series of receptacles having perforate bottoms for the material movable successively through said heating chamber and over said suction box, a combustion chamber in which a gaseous fluid is heated, passages connecting said combustion chamber with said heating chamber and extending alongside of said heating chamber, the bottoms of said passages fitting closely to and projecting slightly over the upper outside edges of the receptacles to seal against leakage and to protect the metal of the receptacles from excessive heat.

4. In a mechanism for heat-treating material, the combination with a chamber providing a heating zone for said material of a chamber providing a soaking zone for said material, a series of receptacles having perforate bottoms for supporting the material in a pervious layer movable successively through said chambers, means for passing a hot gaseous fluid through the entire mass of material while being advanced through said heating zone and means for preventing access of gases and air while said material is being advanced through said soaking zone whereby the cooling of material therein is delayed.

5. The process of calcining alkaline earth carbonate material which comprises forming a pervious layer of said material, continuously feeding said layer through a calcining zone, passing gases heated to a calcining temperature through the entire layer of said material in said calcining zone, then passing said layer through a soaking zone whereby loss of heat by radiation and conduction is prevented and whereby the material is maintained at a calcining temperature for a further period of time.

6. The process of calcining alkaline earth carbonate material, which comprises forming a pervious layer of said material, continuously feeding said layer through a pre-heating zone, causing gases heated below a calcining temperature to pass through the entire layer of material in said zone, then passing said layer through a calcining zone, passing gases heated to a calcining temperature through the entire layer of material in said calcining zone, then passing said layer through a soaking zone whereby loss of heat in said soaking zone is retarded and whereby a calcining temperature is maintained for a further period of time, the heating of the material in said pre-heating zone being accomplished by hot gases which have previously passed through the material in said calcining zone.

7. In an apparatus for heat-treating material, a heating chamber in which material is heated, a suction box beneath said heating chamber, a series of receptacles having perforate bottoms for supporting the material in a pervious layer movable successively through said heating chamber and over said suction box, means for advancing said receptacles through said heating chamber, means for delivering a hot gaseous fluid to the material while being advanced through said heating chamber comprising a combustion chamber communicating with said heating chamber throughout substantially the entire length thereof, means for producing a hot gaseous fluid in said combustion chamber and applying the same therefrom to said heating chamber, means for causing said fluid to be uniformly distributed over the material in said heating chamber and means for causing said fluid to pass through said material.

8. In a mechanism for heat-treating material, the combination with a heating chamber in which said material is continuously heated, a series of receptacles having uniformly perforate bottoms movable successively through said heating chamber, means for advancing said receptacles through said heating chamber, a pair of combustion chambers located on opposite sides of said heating chamber, means for producing hot products of combustion therein, said combustion chambers being adjacent to and communicating with said heating chamber and means for delivering said products of combustion from said combustion chambers to said heating chamber and uniformly distributing the same over the entire surface of the material being heated in said heating chamber, and means for drawing said products of combustion through said material.

9. In apparatus for heat-treating material, the combination with a chamber providing a pre-heating zone for material, of a chamber providing a heating zone for said material, a suction box beneath said heating zone chamber, a series of receptacles having perforate bottoms for the material movable successively through said chambers, means for advancing said receptacles through said chambers and over said suction box, a combustion chamber connected with said heating zone chamber throughout substantially its entire length and having means for producing a hot gaseous fluid therein, means for delivering said hot gaseous fluid from the combustion chamber to the heating chamber and causing said fluid to be uniformly distributed over the material in said heating chamber and drawn therethrough while said material is being advanced through said heating chamber, and means for delivering still hot gaseous fluid from said suction box to the material while said material is being advanced through the heating zone chamber.

10. In apparatus for heat-treating material, a heating chamber in which material is heated, a suction box beneath said heating chamber, a series of receptacles having perforate bottoms for supporting the material in a pervious layer, said receptacles being movable successively through said heating chamber and over said suction box, means for producing a hot gaseous fluid and means for uniformly introducing the same throughout substantially the entire length of said heating chamber, and means for causing said fluid to pass through said material while in said heating chamber.

11. In apparatus for heat-treating material, a heating chamber in which material is heated, a suction box beneath said chamber, a series of receptacles having perforate bottoms for supporting the material in a pervious layer, said receptacles being movable successively through said heating chamber and over said suction box, means for producing a hot gaseous fluid, and means for introducing the same transversely of said heating chamber and throughout substantially the entire length thereof, and means for causing said fluid to pass through said material while in said heating chamber.

In testimony whereof I have hereunto set my hand.

REED W. HYDE.